United States Patent [19]

Murakami et al.

[11] Patent Number: 4,841,384
[45] Date of Patent: Jun. 20, 1989

[54] SERVO PROTECTION CIRCUIT FOR DISK DRIVE

[75] Inventors: Yoichi Murakami, Tokyo; Yoshihisa Okawa, Gunma, both of Japan

[73] Assignee: NEC Corporation, Tokyo, Japan

[21] Appl. No.: 220,146

[22] Filed: Jul. 18, 1988

[30] Foreign Application Priority Data

Jul. 16, 1987 [JP] Japan .................................. 62-178055

[51] Int. Cl.$^4$ ...................... G11B 15/04; G11B 21/10
[52] U.S. Cl. ..................................... 360/60; 360/77.07
[58] Field of Search ..................................... 360/60, 77

[56] References Cited

U.S. PATENT DOCUMENTS 4,688,112 8/1987 Shoji et al. .............................. 360/66

Primary Examiner—Vincent P. Canney
Attorney, Agent, or Firm—Sughrue, Mion, Zinn, Macpeak & Seas

[57] ABSTRACT

A servo protection circuit comprises a sync detector for generating a sync pulse in response to a sync code prerecorded in each sector of a magnetic disk to permit synchronism to be reestablished between the disk and the servo protect pulse at the beginning of each sector. In response to the sync pulse, a servo protect pulse is generated having a duration variable with the interval between successive ones of the sync pulse so that servo protection begins and ends with the beginning and ending points of each prerecorded servocontrol field. The servo protection circuit includes a delay circuit for introducing a shorter delay time of constant duration to the sync pulse to determine the trailing edge of the servo protect pulse and introducing a longer delay time of constant duration to the sync pulse to determine the leading edge of the servo protect pulse.

3 Claims, 3 Drawing Sheets

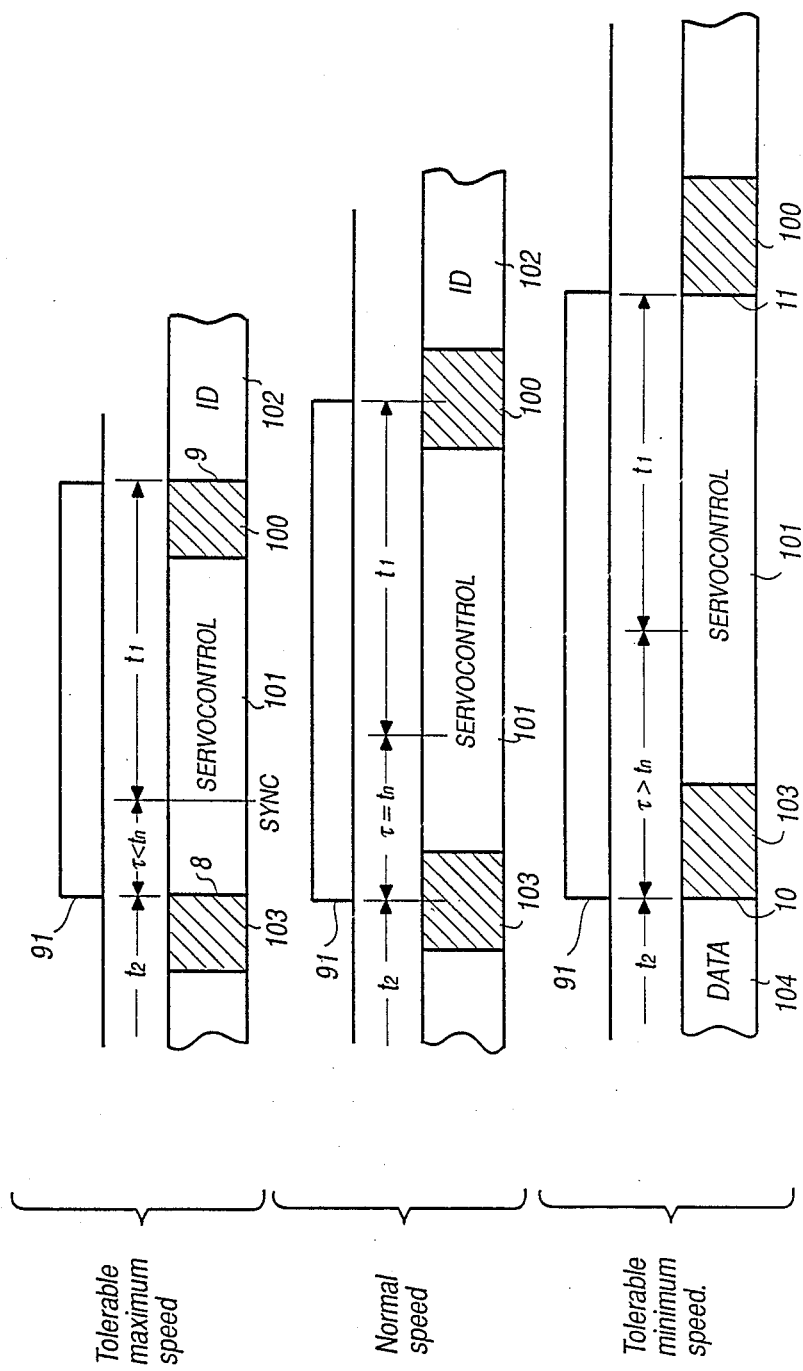

SERVO PROTECTION CIRCUIT FOR DISK DRIVE

BACKGROUND OF THE INVENTION

The present invention relates to a sector servo-controlled disk drive, and more specifically to such a disk drive having a servo protection feature.

In a sector servo-controlled disk drive, the position of a read-write head is controlled so that it traces the right track in response to the tracking information recorded in each servocontrol field of the disk driven by a spindle motor. Servo protection is provided to prevent the tracking information from being inadvertently erased. In the current practice, a servo protect pulse is generated in response to an index pulse which is generated for each revolution of the disk to designate the areas that belong to the servocontrol field. Synchronism can be reestablished between the disk and the servo protect pulse only once for each disk rotation. However, a speed variation of the spindle motor causes the servo protect pulse to go out of sync with the disk. To overcome this problem, it has been necessary to provide a sufficient safety margin at each end of the servocontrol field.

SUMMARY OF THE INVENTION

Accordingly, the present invention provides a servo protection circuit which ensures protection of servocontrol signal without requiring a large safety margin.

The servo protection circuit of the present invention comprises a sync detector for generating a sync pulse in response to a sync code prerecorded in a magnetic disk to permit synchronism to be reestablished between the disk and the servo protect pulse as many times as there are sectors in each track. A servo protect pulse is generated in response to the sync pulse for disabling write operation of the disk during the presence of the servo protect pulse. The servo protect pulse has a duration variable with the interval between successive ones of the sync pulse so that it begins and ends with the beginning and ending points of each prerecorded servocontrol field to compensate for disk speed variations within the range of tolerances. Specifically, a delay circuit is provided for introducing a shorter delay time of constant duration to the sync pulse to produce a first timing signal which determines the trailing edge of the servo protect pulse and further introducing a longer delay time of constant duration to the sync pulse to produce a second timing signal which determines the leading edge of the servo protect pulse. Preferably, an index detector is provided for generating an index signal at each revolution of the disk to produce an initial servo protect pulse having a leading edge coinciding with the index signal and a trailing edge coinciding with the first timing signal.

BRIEF DESCRIPTION OF THE DRAWINGS

The present invention will be described in further detail with reference to the accompanying drawings, in which:

FIG. 3 is a timing diagram useful for describing the operation of the servo protection circuit.

DETAILED DESCRIPTION

Figure 1:
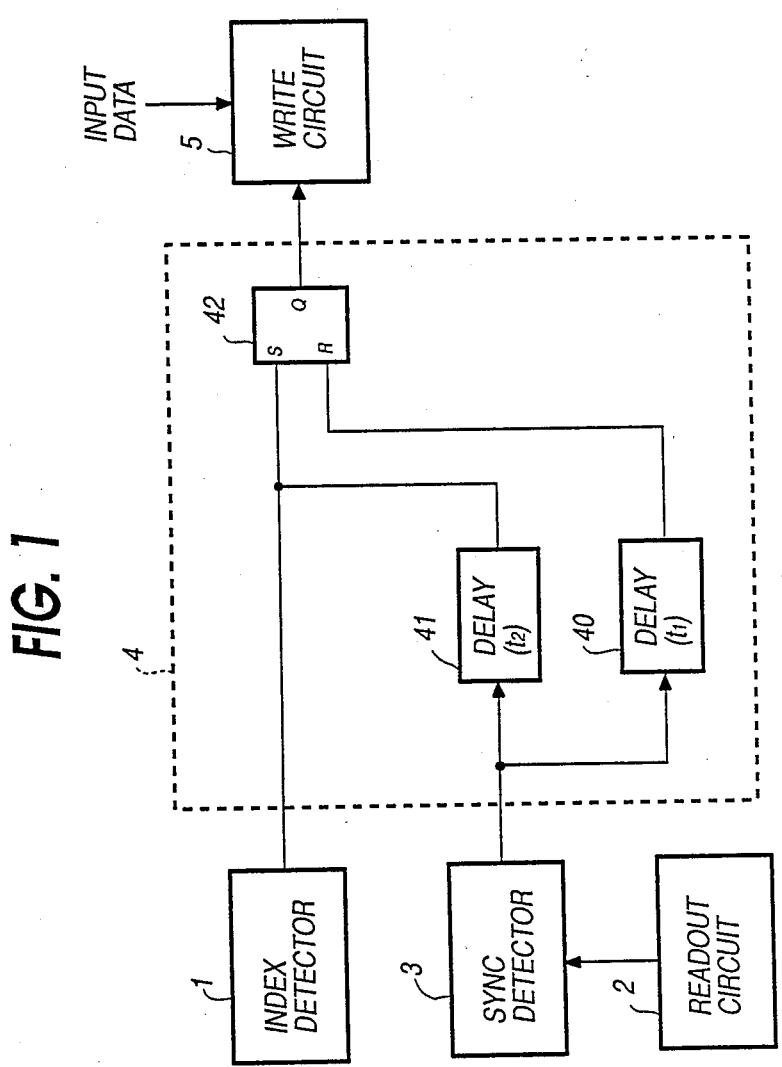
FIG. 1 is a block diagram of a servo protection circuit for use with a magnetic disk drive.

Referring to FIG. 1, a servo protection circuit of the present invention is illustrated. The servo protection circuit includes an index detector 1 for detecting an index pulse which is generated at each revolution of a disk. A readout circuit 2 which reads a servocontrol signal, a sector identifier and a data signal from each one of sectors that comprise a track. The servocontrol signal includes a sync code which is detected by a sync detector 3. On detecting a sync code, the sync detector 3 generates a pulse and applies it to a servo protect pulse generator 4 which comprises delay circuits 40 and 41 and a flip-flop 42. Delay circuits 40 and 41 receive the output of sync detector 3 and introduce delay times $t_1$ and $t_2$, respectively. Flip-flop 42 has a setting input coupled to the outputs of index detector 1 and delay circuit 41 and a resetting input coupled to the output of delay circuit 40. The Q output of flip-flop 42 is applied to a write circuit 5 as a servo protect pulse to disable it from writing input data into the areas where the servocontrol signal is recorded.

Figure 2:
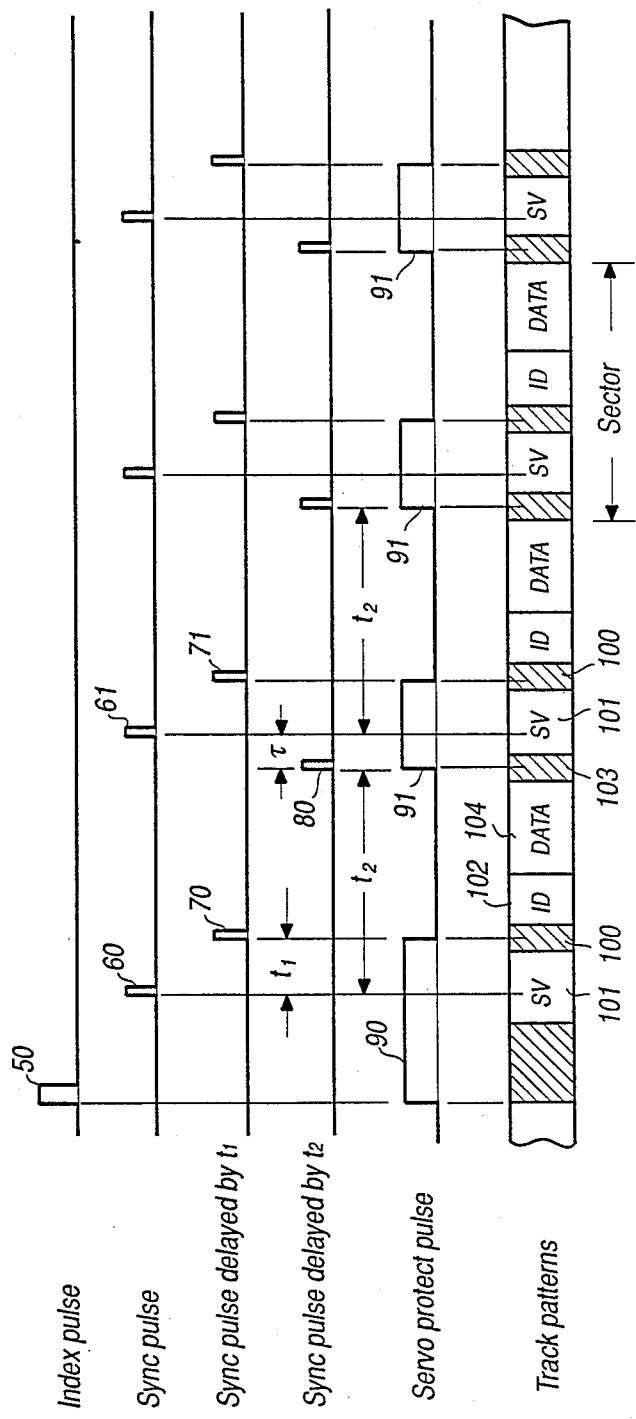
FIG. 2 is a timing diagram associated with the servo protection circuit of FIG. 1.

The operation of the circuit of FIG. 1 will be understood with reference to waveforms shown in FIGS. 2 and 3.

In response to an index pulse 50 from index detector 1 (FIG. 2), flip-flop 42 switches its output to a logic-1 state. Delay circuit 40 produces a pulse 70 delayed by time $t_1$ with respect to a first sync pulse 60 from sync detector 3. In response to the pulse 60, the flip-flop 42 is reset, switching its output to a logic-0 state and producing a first servo protect pulse 90. Flip-flop 42 is then triggered into a set condition in response to a pulse 80 produced by the delay circuit 41 which is delayed by $t_2$ with respect to the first sync pulse 60. Delay circuit 40 then generates a second output pulse 71 in response to a second sync pulse 61 to reset the flip-flop 42, producing a second servo protect pulse 91. Until the occurrence of the next index pulse, the flip-flop 42 is repeatedly set and reset alternately in response to the outputs of the delay circuits 41 and 40. At normal speed, the leading edge of each of the subsequent servo protect pulses 91 occurs at a point ahead of each sync code by an interval $\tau$ which is equal to $t_n$. The delay times $t_1$ and $t_2$ are determined so that, when the disk is rotating at normal speed, the trailing edge of each of the servo protect pulses 90 and 91 coincides with the midpoint of each guardband 100 between a servocontrol field 101 and a sector identifier field 102 and the leading edge of each servo protect pulse 91 following the first servo protect pulse 90 coincides with the midpoint of a guardband 103 between a data field 104 and the servocontrol field 101 of the next sector.

When the rotational speed of the disk momentarily increases within the range of tolerances, the leading edge of the servo protect pulse will occur at a point behind the midpoint of the guardband 103. As clearly shown in FIG. 3, the interval $\tau$ between the leading edge of the servo protect pulse and the sync timing becomes smaller than $t_n$ with the increasing disk speed and hence the duration of the servo protect pulse decreases. As a result, the trailing edge of the servo protect pulse occurs within the guardband 100. Conversely, if the speed of the disk momentarily decreases, the trailing edge of the servo protect pulse will occur at a point ahead of the midpoint of the guard band 103, and the interval $\tau$ between the leading edge of the servo protect pulse and the sync timing becomes greater than $t_n$ with the decreasing speed. Hence, the duration of the servo protect pulse increases with the result that the trailing edge of the servo protect pulse occurs within the guardband 100. As shown in FIG. 3, a tolerable maximum speed will be encountered when the leading edge of the servo protect pulse coincides with a boundary 8 between the guardband 103 and servocontrol field 101 and the trailing edge of the pulse coincides with a boundary 9 between the guardband 100 and the sector identifier field 102. Likewise, a tolerable minimum speed will be encountered when the leading edge of the servo protect pulse coincides with a boundary 10 between the data field 104 of a preceding sector and the servocontrol field 103 and the trailing edge of the pulse coincides with a boundary 11 between the servocontrol field 101 and the guardband 100.

It is seen that, because of the sync-triggered servo protect pulse, synchronism can be reestablished at the beginning of each sector. Since the duration of the servo protect pulse is variable with the interval between sync pulses, the servo protect pulse is timed with the beginning and ending points of each servocontrol field despite a tolerable disk speed change.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A servo protection circuit for protecting a servo-control signal prerecorded in a magnetic recording disk from being erased by write operation, comprising:
   sync detector means for generating a sync pulse in response to a sync code prerecorded in said magnetic disk; and
   servo protection means for generating a servo protect pulse in response to said sync pulse and disabling write operation of said disk during the presence of said servo protect pulse, said servo protect pulse having a duration variable with the interval between successive ones of said sync pulse.

2. A servo protection circuit as claimed in claim 1, wherein said servo protection means comprises;
   delay means for introducing a shorter delay time of constant duration to said sync pulse to produce a first timing signal and introducing a longer delay time of constant duration to said sync pulse to produce a second timing signal; and
   pulse generating means for generating an output pulse as said servo protect pulse in response to said first and second timing signals, said output pulse having a leading edge coinciding with said second timing signal and a trailing edge coinciding with said first timing signal.

3. A servo protection circuit as claimed in claim 2, further comprising means for generating an index signal at each revolution of said disk, wherein said pulse generating means is responsive to said index signal to produce an initial servo protect pulse, said initial servo protect pulse having a leading edge coinciding with said index signal and a trailing edge coinciding with said first timing signal.

* * * * *